United States Patent [19]
Ciobanu et al.

[11] Patent Number: 5,654,527
[45] Date of Patent: Aug. 5, 1997

[54] METHOD AND APPARATUS FOR CONNECTING ELECTRIC BUS

[75] Inventors: Dan A. Ciobanu, La Mirada; Roland B. Lawrence, Palos Verdes Peninsula, both of Calif.

[73] Assignee: The Deutsch Company, Santa Monica, Calif.

[21] Appl. No.: 277,237

[22] Filed: Jul. 19, 1994

[51] Int. Cl.[6] .............................. H01R 4/00; H01R 4/60
[52] U.S. Cl. ...................... 174/88 B; 29/861; 285/382.2
[58] Field of Search .......................... 174/88 B, 70 B, 174/71 B, 72 B, 68.1, 68.2, 84 C; 285/382.2; 29/861, 862, 863

[56] References Cited

U.S. PATENT DOCUMENTS

| | | | |
|---|---|---|---|
| 1,266,441 | 5/1918 | Finkelstein . | |
| 2,044,580 | 6/1936 | Leach . | |
| 2,074,898 | 3/1937 | Fotsch | 173/269 |
| 2,585,770 | 2/1952 | Hammerly . | |
| 2,638,754 | 5/1953 | Macy | 153/1 |
| 2,693,216 | 11/1954 | Kerchner et al. | 153/1 |
| 2,732,420 | 1/1956 | Sillman | 174/68 |
| 2,918,649 | 12/1959 | Staley | 339/276 |
| 2,965,147 | 12/1960 | Hoffman | 153/1 |
| 2,995,615 | 8/1961 | Gibbon | 174/90 |
| 3,033,600 | 5/1962 | Drysdale | 287/114 |
| 3,129,995 | 4/1964 | Brown | 339/97 |
| 3,180,924 | 4/1965 | Rowe | 174/88 |
| 3,428,741 | 2/1969 | Zuch | 174/99 B |
| 3,762,059 | 10/1973 | Dawson | 285/382.2 |
| 3,956,823 | 5/1976 | Kuo | 29/628 |
| 4,179,174 | 12/1979 | Jorgensen | 339/22 B |
| 4,328,982 | 5/1982 | Christianson | 285/382.2 |
| 4,482,174 | 11/1984 | Puri | 285/382.2 |
| 4,626,001 | 12/1986 | Lee | 285/382.2 |
| 4,828,516 | 5/1989 | Shaffer | 439/887 |
| 4,829,146 | 5/1989 | Duve | 174/94 R |
| 5,069,058 | 12/1991 | Hyatt | 74/413 |
| 5,080,406 | 1/1992 | Hyatt et al. | 285/382.2 |
| 5,206,461 | 4/1993 | Genzel et al. | 174/88 B |
| 5,303,958 | 4/1994 | Hyatt et al. | 285/382.2 |
| 5,405,176 | 4/1995 | Babel et al. | 285/382.2 |

OTHER PUBLICATIONS

Drawing of Deutsch Pyplok Coupling, Sep. 13, 1990.
Drawing of Standard Deutsch Permaswage Fitting, Sep. 13, 1990.
Alcoa Conductor Accessories, front cover, p. S4–40, Mar. 1992.
Drawing and Specification of Deutsch Pyplok Coupling, Nov. 23, 1992.
Drawing and Specification of Deutsch Permaswage Standard Part, Jan. 4, 1993.
Sefcor, Substation Power Connector Quick Reference Handbook, front cover, back cover, pp. BS–11 to BS–14, C–53 to C–54 and TM–37 to TM–37, Oct. 1993.

*Primary Examiner*—Kristine L. Kincaid
*Assistant Examiner*—Chau N. Nguyen
*Attorney, Agent, or Firm*—Pretty, Schroeder & Poplawski

[57] ABSTRACT

A bus coupling for connection to bus in an electrical system including a coupling having a substantially cylindrical outer surface and an inner surface for receiving the bus. A portion of the outer surface of the coupling and the bus are compressed by a swaging tool until they plastically deform radially inwardly to form a swaged connection. An antioxidant composition may be applied between the coupling and the bus, with an annular groove in the inner surface of the coupling accumulating any of the excess composition. A counterbore on the inner surface at one end of the coupling may be filled with a sealing material to prevent water accumulation that could weaken the connection in freezing climates. The one end of the coupling also has a smooth, curved surface to reduce the adverse consequences normally associated with the corona effect.

22 Claims, 3 Drawing Sheets

METHOD AND APPARATUS FOR CONNECTING ELECTRIC BUS

BACKGROUND OF THE INVENTION

The present invention relates to couplings for connecting electric bus and, more particularly, to a coupling for connection to a bus by swaging.

Electric bus has been used for many years as an electrical conductor in a wide variety of applications. Conventional bus typically is formed in the shape of rods or tubes and is constructed from aluminum, copper or other suitable materials. The bus usually comes in sections and, therefore, must be joined together by a coupling or connector that is itself electrically conductive. In this way, the bus sections can be connected together in a variety of configurations to extend electrical circuits in electrical systems.

One of the most common types of electric bus couplings comprises a cylindrical coupling having essentially a smooth bore for receiving the bus. Once the bus is inserted into the coupling, the end of the coupling is welded to the outer surface of the inserted bus using known welding techniques. While couplings welded to bus have been generally accepted for their intended purpose, they are not without significant drawbacks.

For example, welded couplings are joined to the bus only in the area of the welded joint. This is a relatively small, annular area by comparison to the entire area of overlapping connection between the coupling and the inserted bus. As a result, any failure of the weld or the adjacent area can result in a total failure of the entire connection. In addition, heat created during the welding process anneals both the coupling and the bus in the area of the weld and the immediately surrounding areas. This causes stress concentration and, therefore, a weak link in the connection that contributes to the possibility of failure of the joint. Still further, it is difficult to inspect the integrity of a welded connection, and it is generally a dirty and relatively time-consuming process. Thus, when it is necessary to make a repair in the field, the welding time expended to make the repair can be significant. Moreover, the requirement of transporting the welding equipment to and from the repair site poses additional drawbacks.

Another matter relates to the requirement that the bus coupling be able to provide a branch connector so that electricity can be transferred via the coupling to other electrical circuits in the electrical system. At the present time, conventional couplings usually employ so-called NEMA pads to accomplish this function. A NEMA pad generally comprises a substantially flat, rectangular plate extending at a 90° angle, or other suitable angle, to the outer surface of the coupling. NEMA pads are frequently required to be welded to the coupling and, therefore, they are subject to the same drawbacks discussed above with respect to the welding of couplings to the bus.

Beyond this, connections by the use of NEMA pads require that one NEMA pad be connected to another NEMA pad by conventional nuts and bolts inserted in aligned bores in the pads. When the NEMA pads are subjected to variations in temperature, they expand and contract causing separation between the pads. Vibration and other forces also can cause separation. Even minor separation undetectable to the human eye can result in hot spots, loss of current, and other undesirable effects. When this occurs, a technician must go out in the field and manually remove the bolts, clean the contacting surfaces of the NEMA pads with a wire brush, and then retighten the bolts to reconnect the pads. Experience has proven this procedure to be a relatively time-consuming, inconvenient and expensive process.

A further problem with existing couplings is that they are generally ineffective in minimizing the so-called "corona effect." The corona effect usually occurs very rapidly and, therefore, causes relatively rapid corrosion of the joint between the coupling and the bus. The corona effect also is undesirable because it drains electrical energy.

While attempts have been made to design bus couplings that avoid the foregoing problems, these couplings tend to be relatively complicated, expensive to install, or require the use of special equipment.

Accordingly, there has existed a definite need for a coupling for connecting bus which can be rapidly installed for securely connecting bus segments together, which provides a stronger and more secure connection than welded couplings, and which can be conveniently and inexpensively installed in the field, both during initial installation and when repairs are needed. The present invention satisfies these and other needs, and provides further related advantages.

SUMMARY OF THE INVENTION

The present invention provides a coupling for connection to bus in an electrical system or the like. The coupling comprises a substantially cylindrical outer surface and an inner surface for receiving a bus. In accordance with the invention, a portion of the outer surface of the coupling and the bus are compressed by a swaging tool, thereby causing the coupling and the bus to plastically deform radially inwardly. This forms a secure, swaged connection between the coupling and the bus that is highly resistant to failure under bending, tensile, torque and other types of loads and vibrations.

In one embodiment of the invention, the inner surface of the coupling includes an annular groove adjacent to one end of the coupling. When a layer of an anti-oxidant composition is applied between the coupling and the bus, the annular groove retains any excess composition to prevent the formation of oxidant and to enhance the overall seal between the coupling and the bus. The coupling also is preferably provided with a counterbore on the inner surface at the one end of the coupling. This counterbore is filled with an elastomer to still further enhance the seal between the coupling and the bus and to prevent the accumulation of water at the interface between the connected components. In an alternative embodiment, the counterbore is replaced by another annular groove in the inner surface of the coupling for receiving the elastomer. This additional annular groove preferably is positioned between the first annular groove discussed above and the one end of the coupling.

In one aspect of the invention, the outer surface at one or both ends of the coupling comprises a relatively smooth, curved surface. This smooth, curved surface provides a gradual transition from the cylindrical outer surface to the end of the coupling. This has the effect of reducing as much as possible the corona effect normally associated with bus couplings.

In another aspect of the invention, the coupling includes a branch connector so that electricity can be transferred from the coupling to other electrical circuits in the electrical system. The branch connector is similar in configuration to the coupling described above, in that the branch connector has a substantially cylindrical outer surface and an inner surface for receiving another bus. It also has an annular groove and a counterbore in its inner surface adjacent to one end of the branch connector for receiving the anti-oxidant composition and silicone discussed above. The bus is connected to the one end of the branch connector by swaging, while the opposite end of the branch connector is joined to the outer surface of the coupling by welding.

The branch connector of the present invention avoids the problems associated with NEMA pads because a secure, swaged connection is provided between the branch connector and the bus. If desired, however, conventional NEMA pads can be attached to the coupling in the conventional manner to transfer electricity to other electrical circuits in the electrical system.

Other features and advantages of the invention will become apparent from the following detailed description, taken in conjunction with the accompanying drawings, which illustrate, by way of example, the principles of the invention.

BRIEF DESCRIPTION OF THE DRAWINGS

The accompanying drawings illustrate the invention. In such drawings.

DESCRIPTION OF THE PREFERRED EMBODIMENTS

Figure 1:
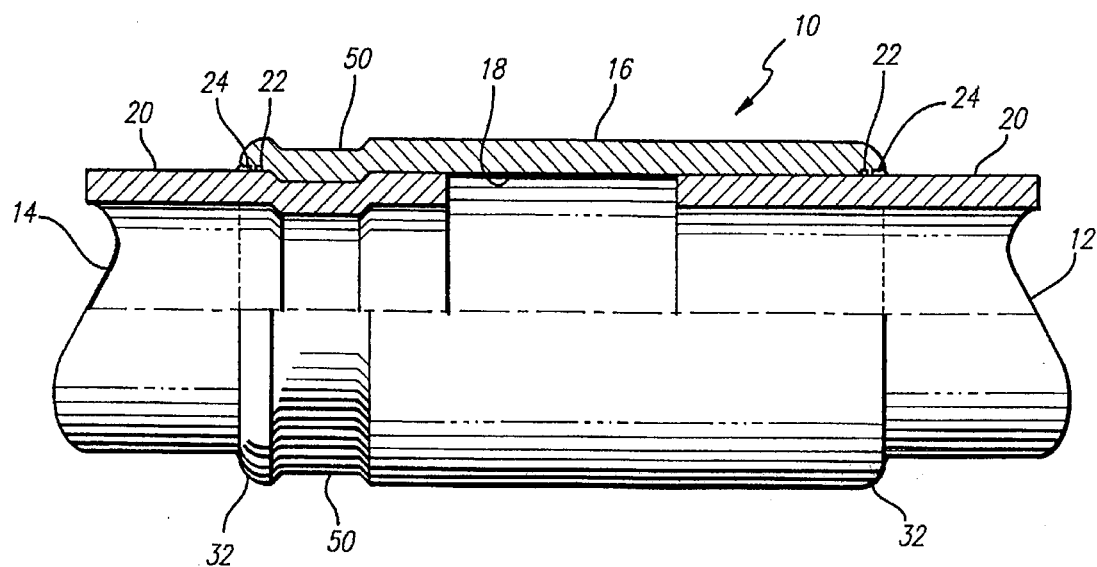
FIG. 1 is an elevational view, partly in cross-section, showing a coupling embodying the novel features of the invention for connection to a pair of buses by swaging, with the right portion of the figure showing the coupling before swaging and the left portion of the figure showing the coupling after swaging.

The present invention is embodied in a bus coupling, generally referred to by the reference numeral 10, for connecting buses 12 and 14 in an electrical system or the like. FIG. 1 shows the coupling 10 and two buses 12 and 14 inserted into the coupling from opposite ends of the coupling. The right portion of FIG. 1 shows the coupling 10 and bus 12 prior to swaging, and the left portion of FIG. 1 shows the coupling 10 and bus 14 after swaging. As discussed in detail below, the swaged connection between the coupling 10 and the buses 12 and 14 provides numerous benefits and advantages in the field of connecting buses.

Before proceeding to a discussion of the coupling 10, it will be understood that the embodiment of the coupling illustrated in the drawings is of the type used to connect two buses 12 and 14 to each other, and is just one of many different coupling configurations. For example, the coupling 10 of the present invention can be designed so that it serves as an end cap for connection to a single bus. Alternatively, and as discussed in more detail below, the coupling 10 may have branch connectors and the like for connection to a plurality of bus sizes. For the purposes of understanding the invention, however, the following discussion will focus primarily on one end of the coupling 10 and how it is connected to the bus 12. When a coupling 10 is designed with multiple ends, multiple bus can be connected to these ends in the same manner.

Figure 2:
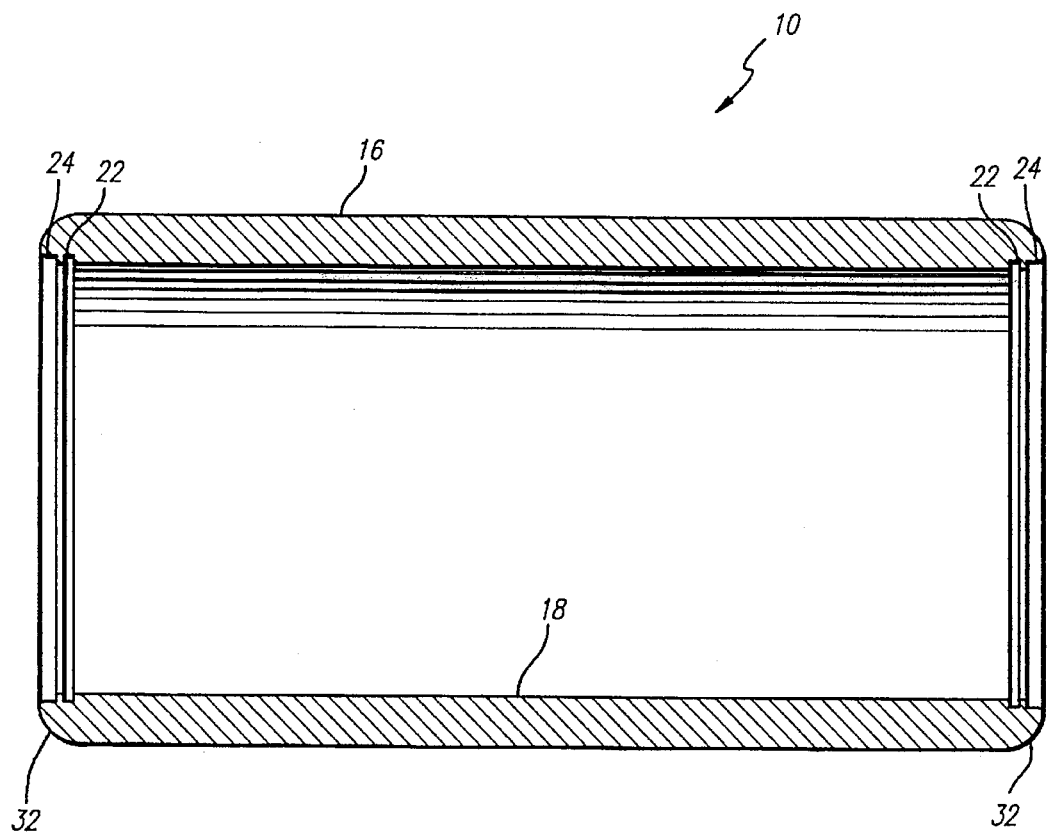
FIG. 2 is an enlarged cross-sectional elevational view of the coupling, with the buses removed.

FIG. 2 is an enlarged, cross-sectional view of the coupling 10 according to one embodiment of the invention. The coupling 10 comprises a substantially smooth, cylindrical outer surface 16 and a substantially smooth, cylindrical inner surface 18. Although the inner surface 18 of the coupling 10 is depicted as being cylindrical, it will be appreciated that the geometric configuration of the inner surface 18 of the coupling must be designed to match the corresponding outer surface 20 configuration of the bus 12. Therefore, the inner surface 18 of the coupling 10 need not be cylindrical, but may take other configurations as may be necessary to receive the bus 12.

Figure 3:
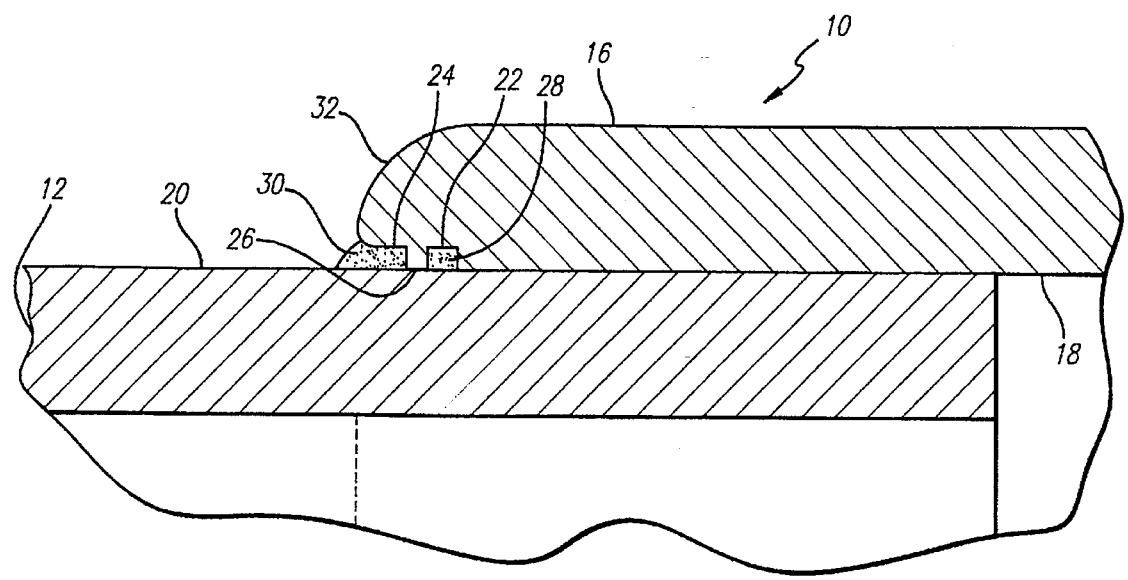
FIG. 3 is a cross-sectional view showing an enlarged section of one embodiment of the coupling.

Two surface discontinuities are provided immediately adjacent to the opposite ends of the coupling 10 at its inner surface 18. These discontinuities comprise an annular groove 22 and a counterbore 24 in the end of the coupling. Inasmuch as the counterbore 24 is at the very end of the coupling 10, the annular groove 22 is spaced axially inwardly from the counterbore, but only by a small amount. Accordingly, the counterbore 24 and the annular groove 22 are separated from each other by a small, annular land 26, as best shown in FIG. 3. This annular land 26 has the same internal diameter as the inner surface 18 of the coupling 10.

FIG. 3 shows an enlarged section of the coupling 10 and bus 12 in which the bus 12 has been inserted into the coupling before swaging. Prior to insertion of the bus 12 into the coupling 10, the inner surface 18 of the coupling and the outer surface 20 of the bus are cleaned by suitable cleaning methods. A relatively thin layer of an anti-oxidant composition 28 is then applied to one or both of the contacting surfaces of the coupling 10 and the bus 12. The anti-oxidant composition 28 further cleans these contacting surfaces and prevents oxidant from forming. The anti-oxidant composition 28 also serves a contact or friction enhancement function to improve the electrical contact between the coupling 10 and the bus 12.

When the bus 12 is inserted into the coupling 10, some of the anti-oxidant composition 28 will accumulate in the first annular groove 22 in the inner surface 18 of the coupling. Although the layer of anti-oxidant composition 28 should be applied very thinly, the tolerance between the coupling 10 and the bus 12 preferably will be relatively small. Thus, some of the composition 28 will still be drawn into the annular groove, when the coupling is swaged onto the bus 12. The accumulation of the anti-oxidant composition 28 in the annular groove 22 provides a reservoir of the composition to fight the formation of oxidant. It also effectively creates a seal between the contacting surfaces of the coupling 10 and the bus 12. In the preferred embodiment, the anti-oxidant composition 28 comprises Alcoa Filler Compound, a material having the ability to dissolve or inhibit the formation of an oxide film on the surfaces of the materials involved in carrying electric current. Further, this material incorporates particles (grit) that resist sliding of the swaged surface. Alcoa Filler Compound is manufactured by Alcoa Conductor Accessories, a division of Alcoa Fujikura, Ltd., Duncan, S.C.

FIG. 3 also shows a sealing material 30 in the space between the coupling 10 and the bus 12 defined by the counterbore 24. This sealing material 30 preferably comprises an elastomer such as silicone and, more preferably, room temperature vulcanizing silicone. The elastomer is designed to provide a further seal between the coupling 10 and the bus 12 and is specifically intended to prevent moisture, water and other fluids from accumulating in this area. This has particular benefits in climates where the bus 12 will be subjected to freezing temperatures. By using elastomer sealing material 30 in the counterbore 24, fluids cannot accumulate between the coupling 10 and the bus 12. Hence, in freezing temperatures, no fluids will be accumulated between the coupling 10 and the bus 12 which could freeze and expand and weaken the joint.

As noted above, there are only two discontinuities on the inner surface 18 of each end of the coupling 10. It has been found that, by minimizing the number of discontinuities, a more effective joint is created between the coupling 10 and the bus 12. Therefore, the annular groove 22 and counterbore 24 constitute the only discontinuities along the inner surface 18 of the coupling 10 and thereby provide a simpler and more trouble-free coupling. Such a coupling 10 is also less expensive to manufacture.

Another feature of the invention comprises the special shape of the ends of the coupling 10. As shown in FIG. 3, the outer surface 16 of each end of the coupling 10 comprises a relatively smooth, curved surface 32. This smooth, curved surface 32 provides a gradual transition from the cylindrical outer surface 18 to the one end of the coupling 10. By providing a surface 32 having this curved configuration, instead of a chamfered surface with corners, it has been found that the corona effect associated with the coupling 10 is substantially minimized. As a result, the effects of corrosion and the amount of electrical energy drained by the corona effect is reduced.

Figure 4:
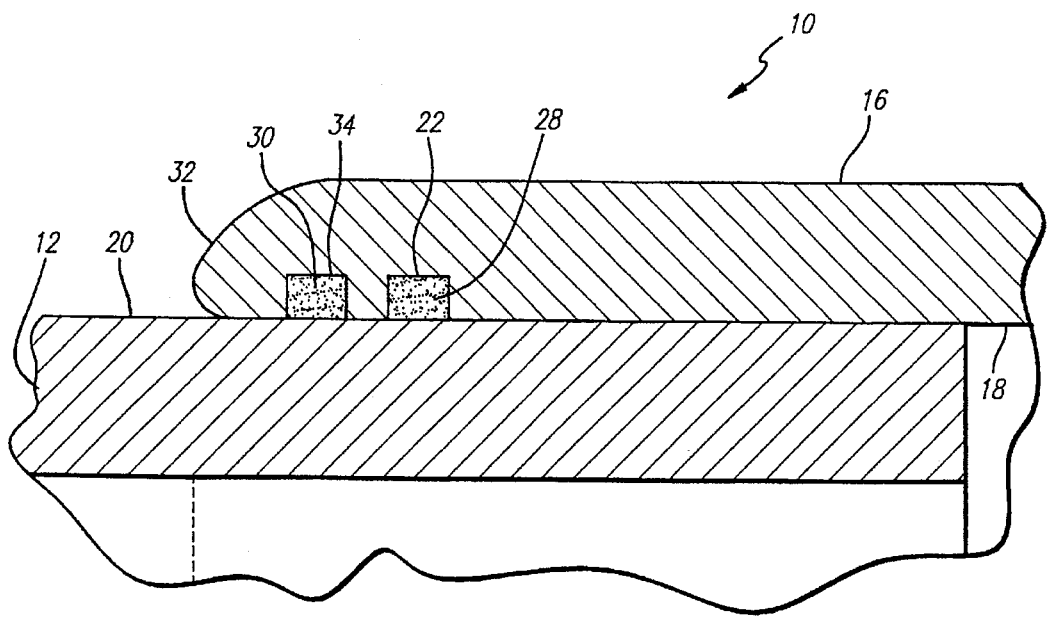
FIG. 4 is another cross-sectional view showing an enlarged section of an alternative embodiment of the coupling.

FIG. 4 shows an enlarged section of an alternative embodiment of the coupling 10. In this alternative embodiment, the counterbore 24 has been omitted and replaced by a second annular groove 34 in the inner surface 18 of the coupling 10. This second annular groove 34 is axially positioned between the first annular groove 22 discussed above and the outer end of the coupling 10. An elastomer sealing material 30, such as room temperature vulcanizing silicone, preferably is placed in the second annular groove 34. Aside from this, the remaining structural features of the coupling in this alternative embodiment are the same as those discussed above in the first embodiment of the coupling.

Figure 5:
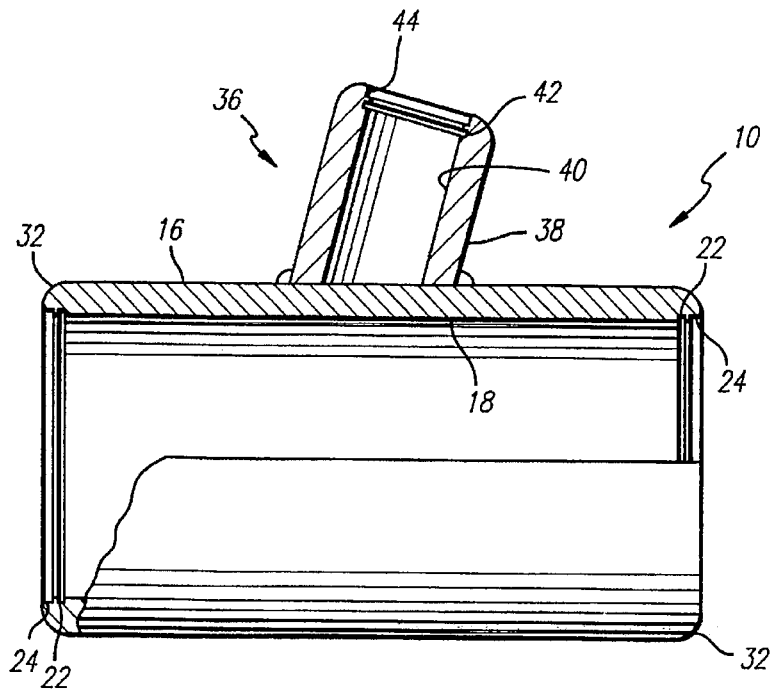
FIG. 5 is an elevational view, partly in cross-section, showing another embodiment of the coupling, with a branch connector extending at an angle from the coupling for connection to another bus, a cable or other conductor.

FIG. 5 shows another embodiment of the coupling 10, with a branch connector 36 extending at an angle from the coupling for connection to another bus or cable. The branch connector 36 enables electricity to be transferred from the main coupling 10 to other electrical circuits in the electrical system. The branch connector 36 is similar in configuration to the coupling 10 described above in that the branch connector comprises a substantially cylindrical outer surface 38 and an inner surface 40 for receiving another bus or cable. It also has an annular groove 42 and a counterbore 44 in its inner surface 40 adjacent to one end of the branch connector 36 for receiving the anti-oxidant composition and silicone sealing material discussed above. Annular groove 42 and counterbore 24 can be eliminated when swaged on cable. The bus is connected to the one end of the branch connector 36 by swaging which radially compresses the branch connector and the inserted bus and causes the branch connector and the second bus to plastically deform radially inwardly and form a swaged connection.

The branch connector 36 of the present invention advantageously avoids the problems associated with NEMA pads. Because the branch connector 36 provides a secure, swaged connection to the bus, there is no concern for separation. Also, there are no nuts and bolts to assemble and disassemble or which could become loosened over time. As a result, the connection of buses to the branch connector 36 is rapid and convenient, and does not require the use of nuts or bolts or welding.

Figure 6:
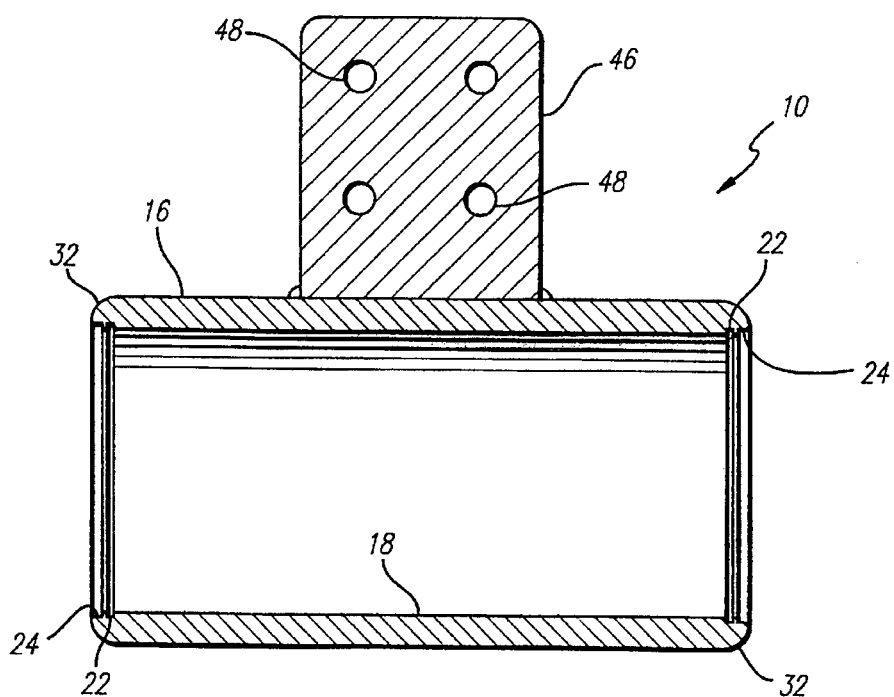
FIG. 6 is an elevational view, partly in cross-section, showing another embodiment of the coupling, with a conventional NEMA pad extending from the outer surface of the coupling.

Of course, the coupling 10 of the present invention may be used with conventional NEMA pads. As illustrated in FIG. 6, a conventional NEMA pad 46 may be joined to the outer surface 16 of the coupling 10. The NEMA pad 46 comprises a flat, rectangular pad having a plurality of bores 48 for receiving bolts (not shown) for connection to another NEMA pad in the usual manner. In the preferred embodiment, however, the NEMA pad 46 is not made from an annealed material like conventional NEMA pads but, rather, is made from a harder material.

Swaging of the coupling 10 to the bus 12 preferably is accomplished by a swaging tool of the type described in U.S. Pat. No. 5,069,058, which is incorporated herein by reference. Briefly, the swaging tool comprises upper and lower dies which surround the outer surface 18 of the coupling 10 and which are moved toward each other to apply radially compressive forces of high magnitude to plastically deform the coupling 10 and the bus 12 and form a swaged connection. A head of the tool holds the upper die and is removable for positioning the dies with respect to each other. The tool may be operated by hydraulic, pneumatic or mechanical means, and the swaging process only takes a matter of seconds.

The coupling 10 of the present invention provides numerous features and advantages. One significant advantage is that, once the coupling 10 is installed, it provides a relatively small resistance and, therefore, high conductivity. This conductivity is equal to or better than an equal end of a bus 12.

Referring again to FIG. 1, it will be noted that a footprint 50 is created on the outer surface 16 of the coupling 10 after it has been swaged. This footprint 50 corresponds to the plastically deformed section of the coupling 10 and bus 14. Contrary to welded connections, in which a failure of the weld will cause total failure of the joint, the coupling 10 of the present invention is much less prone to failure. Even when there is a possibility of failure, the area of deformation caused by the swaging process requires that the entire inserted section of the bus 14 must be pulled past that area of deformation 50 before total failure can occur.

By way of example, a welded connection usually will snap and result in total failure during an earthquake or other severe vibration. With the coupling 10 of the present invention, however, any failure will occur at a much slower rate. This is because the entire bus 14 must be pulled out of the coupling 10 and past the plastically deformed section 50 of the coupling. This would occur relatively slowly and, during the pull out, the resistance will actually go down due to the scraping, frictional contact between the coupling 10 and the bus 14. In other words, the electrical conductivity will increase before a total failure occurs.

It also has been found that a footprint 50 having a relatively small axial length improves the strength of the swaged connection. This is contrary to conventional thinking, in which a footprint having a larger axial length would be considered a more secured connection. However, the opposite is true, and a smaller footprint has been found to be superior. It is also noted that the coupling 10 is constructed from a material that is softer than the material of the bus 14. Thus, at the conclusion of the swaging step, the spring back of the bus 14 is greater than the spring back of the coupling 10. Hence, a securely swaged connection is formed. Early indications reveal that the coupling 10 of the present invention is superior to welded couplings in areas such as tensile strength, torque strength, bending strength, resistance to vibration and other areas.

The coupling 10 of the present invention also is superior to welded connections because it does not cause any annealing of the bus 14 or the coupling during the connection process. To the contrary, swaging causes work hardening of the coupling 10 and the bus 14 and therefore increases the total strength of the connection.

Since swaging of the coupling 10 to the bus 14 takes only a matter of seconds, the coupling can be, conveniently and rapidly installed in the field, both during initial installation of the electrical system and when repairs are needed. Swaging also is a relatively clean process that generally does not impose any of the hazards associated with torch welding and the like.

While a particular form of the invention has been illustrated and described, it will be apparent that various modifications can be made without departing from the spirit and scope of the invention, therefore, it is not intended that the invention be limited, except as by the appended claims.

We claim:

1. A bus coupling, comprising:
    a coupling having a substantially cylindrical outer surface and an inner surface for receiving a bus;
    a counterbore in the inner surface at one end of the coupling;
    an annular groove in the inner surface of the coupling adjacent to the one end of the coupling and an antioxidant composition in the annular groove of the coupling; and
    a longitudinally extending portion of the cylindrical outer surface of the coupling adjacent to the one end of the coupling having a constant outer diameter being adapted for engagement by a swaging tool for radially compressing the coupling and the bus and thereby causing the coupling and the bus to plastically deform radially inwardly to form a swaged connection between the bus and the coupling.

2. The bus coupling of claim 1, further comprising a sealing material in the counterbore.

3. The bus coupling of claim 1, wherein the outer surface of the one end of the coupling comprises a substantially smooth, curved surface.

4. The bus coupling of claim 1, wherein the coupling is made from aluminum alloys.

5. A method of connecting a coupling to a tubular electric bus, comprising:
    providing a coupling having a substantially cylindrical outer surface and an inner surface for receiving an electric bus, the outer surface defining a longitudinally extending portion that represents the full length of the coupling to be compressed to the electric bus, the longitudinally extending portion located adjacent one end of the coupling and having a constant outer diameter along its full length;
    inserting the electric bus into the one end of the coupling; and
    compressing the longitudinally extending portion of the coupling along its full length to plastically deform the coupling and the electric bus radially inwardly around their full circumferences to form a swaged connection between the coupling and the electric bus
    wherein the longitudinally extending portion of the cylindrical outer surface of the coupling is spaced from the one end of the coupling; and
    wherein the longitudinally extending portion is compressed to form a footprint around the full circumference of the coupling, with the footprint having an outer diameter that is less than the diameter of the outer surface of another portion of the coupling located between the footprint and the one end of the coupling.

6. The method of claim 5, further comprising a counterbore in the inner surface at the one end of the coupling, and a sealing material in the counterbore that creates a seal between the bus and the one end of the coupling.

7. The method of claim 5, further comprising a first annular groove in the inner surface of the coupling adjacent to the one end of the coupling.

8. The method of claim 7, further comprising a second annular groove in the inner surface of the coupling that is axially positioned between the first annular groove and the one end of the coupling, an anti-oxidant composition in the first annular groove and between the contacting surfaces of the bus and the coupling and a sealing material in the second annular groove that creates a seal between the bus and the one end of the coupling.

9. The method of claim 5, wherein the outer surface of the one end of the coupling comprises a substantially smooth, curved surface.

10. The method of claim 5, further comprising applying an anti-oxidant composition between the coupling and the bus, wherein excess anti-oxidant composition between the coupling and the bus is accumulated in an annular groove in the inner surface of the coupling.

11. A method of connecting a coupling to a tubular electric bus, comprising:
    providing a coupling having a substantially cylindrical outer surface and an inner surface for receiving an electric bus, the coupling defining a longitudinally extending part that represents the full length of the coupling to be compressed to the electric bus, the longitudinally extending portion located adjacent one end of the coupling and having a constant thickness along its full length;
    inserting the electric bus into the one end of the coupling; and
    compressing the longitudinally extending portion of the coupling along its full length to plastically deform the coupling and the electric bus radially inwardly around their full circumferences to form a swaged electrical connection between the coupling and the electric bus.

12. The method of claim 11, wherein the longitudinally extending part of the coupling is spaced from the one end of the coupling.

13. The method of claim 12, wherein the longitudinally extending part is compressed to form a footprint around the full circumference of the coupling, with the footprint having an outer diameter that is less than the diameter of the outer surface of another portion of the coupling located between the footprint and the one end of the coupling.

14. The method of claim 11, further comprising a counterbore in the inner surface at the one end of the coupling, and a sealing material in the counterbore that creates a seal between the bus and the one end of the coupling.

15. The method of claim 11, further comprising a first annular groove in the inner surface of the coupling adjacent to the one end of the coupling.

16. The method of claim 15, further comprising a second annular groove in the inner surface of the coupling that is axially positioned between the first annular groove and the one end of the coupling, an anti-oxidant composition in the first annular groove and between the contacting surfaces of the bus and the coupling and a sealing material in the second annular groove that creates a seal between the bus and the one end of the coupling.

17. The method of claim 11, wherein the outer surface of the one end of the coupling comprises a substantially smooth, curved surface.

18. The method of claim 11, further comprising the step of applying an anti-oxidant composition between the coupling and the bus, wherein excess anti-oxidant composition between the coupling and the bus is accumulated in an annular groove in the inner surface of the coupling.

19. A bus coupling, comprising:

a coupling having a substantially cylindrical outer surface and an inner surface for receiving a bus;

a first annular groove in the inner surface of the coupling adjacent to the one end of the coupling, and an anti-oxidant composition in the first annular groove and between the contacting surfaces of the bus and the coupling;

a second annular groove in the inner surface of the coupling that is axially positioned between the first annular groove and the one end of the coupling, and a sealing material in the second annular groove that creates a seal between the bus and the one end of the coupling; and a longitudinally extending portion of the cylindrical outer surface of the coupling adjacent to the one end of the coupling having a constant outer diameter being adapted for engagement by a swaging tool for radially compressing the coupling and the bus and thereby causing the coupling and the bus to plastically deform radially inwardly to form a swaged connection between the bus and the coupling.

20. A bus coupling, comprising:

a coupling having a substantially cylindrical outer surface and an inner surface for receiving a bus;

a counterbore in the inner surface at one end of the coupling; and a longitudinally extending portion of the cylindrical outer surface of the coupling adjacent to the one end of the coupling having a constant outer diameter being adapted for engagement by a swaging tool for radially compressing the coupling and the bus and thereby causing the coupling and the bus to plastically deform radially inwardly to form a swaged connection between the bus and the coupling;

wherein the outer surface of the one end of the coupling comprises a substantially smooth, curved surface.

21. The bus coupling of claim 20, further comprising a sealing material in the counterbore.

22. The bus coupling of claim 20, further comprising an annular groove in the inner surface of the coupling adjacent to the one end of the coupling.

* * * * *